United States Patent [19]

Re et al.

[11] Patent Number: 4,782,130

[45] Date of Patent: Nov. 1, 1988

[54] FLUORINATED POLYURETHANES CONTAINING POLYOXYPERFLUORO-ALKYLENE BLOCKS, ENDOWED WITH IMPROVED MECHANICAL CHARACTERISTICS

[75] Inventors: Alberto Re, Milan; Ezio Strepparola, Bergamo; Piero Gavezzotti, Milan, all of Italy

[73] Assignee: Ausimont S.p.A., Milan, Italy

[21] Appl. No.: 828,681

[22] Filed: Feb. 12, 1986

[30] Foreign Application Priority Data

Feb. 13, 1985 [IT] Italy .................. 19497 A/85

[51] Int. Cl.[4] ............................................. C08G 18/32
[52] U.S. Cl. ...................................... 528/70; 149/19.4
[58] Field of Search ................ 149/19.3, 19.4; 528/70, 528/79, 88; 568/726, 810, 811, 831

[56] References Cited

U.S. PATENT DOCUMENTS

| | | | |
|---|---|---|---|
| 3,141,294 | 7/1964 | Lawrence et al. | 528/85 |
| 3,304,334 | 2/1967 | Jones | 528/70 |
| 3,340,310 | 9/1967 | Gilbert et al. | 568/726 |
| 3,385,901 | 5/1968 | Tamborski et al. | 528/70 |
| 3,574,770 | 4/1971 | Stump et al. | 528/70 |
| 3,755,265 | 8/1973 | Fletcher et al. | 528/70 |
| 3,810,874 | 5/1974 | Mitsch et al. | 528/70 |
| 3,849,504 | 11/1974 | Mitsch | 528/70 |
| 3,972,856 | 8/1976 | Mitsch et al. | 528/70 |
| 4,365,099 | 12/1982 | Faler et al. | 568/726 |

FOREIGN PATENT DOCUMENTS

0148482A2 7/1985 European Pat. Off. .
0151877A2 8/1985 European Pat. Off. .

*Primary Examiner*—Veronica P. Hoke
*Attorney, Agent, or Firm*—Stevens, Davis, Miller & Mosher

[57] ABSTRACT

Fluorinated polyurethanes, having improved mechanical characteristics and a glass transition temperature lower than $-80°$ C., containing polyoxyperfluoroalkylene blocks deriving from perfluoropolyethers having hydroxylated end groups and/or from perfluoropolyethers having isocyanate end groups and furthermore units deriving from an aromatic or a cycloaliphatic diol.

5 Claims, No Drawings

FLUORINATED POLYURETHANES CONTAINING POLYOXYPERFLUORO-ALKYLENE BLOCKS, ENDOWED WITH IMPROVED MECHANICAL CHARACTERISTICS

DESCRIPTION

The object of the present invention is to provide fluorinated polyurethanes having a glass transition temperature lower than −80° C. and endowed with improved mechanical characteristics with respect to the ones of the fluorinated polyurethanes of the prior art.

BACKGROUND OF THE INVENTION

There are known polyurethanes characterized by the presence, in their structure, of polyoxyperfluoroalkylene blocks deriving from the use of perfluoropolyethers with hydroxylated end groups. Products of such type are described in particular in Italian Pat. No. 903446: they are characterized by a glass transition temperature (Tg) lower than −78° C. and therefore they retain flexibility and elastic properties even at very low temperatures. The fluorinated polyurethanes known so far, however, do not possess in the whole optimum mechanical characteristics as regards hardness, tensile strength, elastic modulus, elongation.

THE PRESENT INVENTION

The fluorinated polyurethanes according to the present invention are characterized by a block structure, comprising:
(A) Sequences of fluoroxyalkylene units selected from the following classes:
I—$(C_2F_4O)$, $(CF_2O)$ said units being randomly placed along the fluoropolyoxyalkylene chain;
II—$(C_3F_6O)$, $(C_2F_4O)$, $(CFXO)$ wherein X=F or $CF_3$, said units being randomly placed along the fluoropolyoxyalkylene chain;
III—$(CH_2CF_2CF_2O)$ said units in the fluoropolyoxyalkylene chain being linked between them as follows:

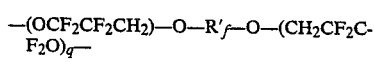

wherein $R'_f$ is a fluoroalkylene group and p and q are integer, p+q being higher than 2;
IV—

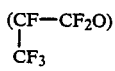

said units being linked between them in the fluoropolyoxyalkylene chain as follows:

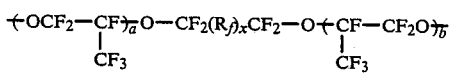

wherein $R_f$ is a fluoroalkylene group, x is 0 or 1, a and b are integer and a+b higher than 2.

The single blocks of fluorooxyalkylene units have an average molecular weight between 500 and 7000.

The fluorinated polyurethanes according to the present invention are furthermore characterized by the presence of:

(B) units deriving from fluorinated or non fluorinated diols or triols, containing one or more aromatic or cycloaliphatic or polycyclic rings.

Such diols and triols are in particular selected from:

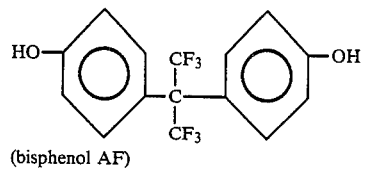
(bisphenol AF)

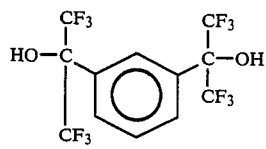

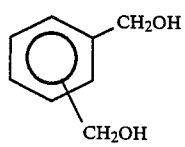

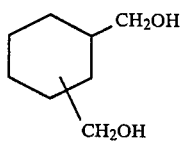

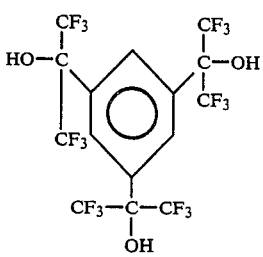

From 1 to 100 and preferably from 5 to 100 type B units are present for 100 polyoxyfluoroalkylene blocks.

The polyurethanes according to the invention may advantageously include also perfluoropolyethereal-chain blocks, deriving from the use of starting diols, having an average molecular weight from 500 to 7000, and included in the following general formula:

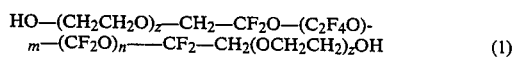 (1)

wherein z ranges from 0 to 3 and m/n ratio ranges from 0.2 to 2 preferably from 0.5 to 1.2.

It is possible also to use, as perfluorinated diols, the compounds having a perfluoropolyethereal chain of the type indicated hereinbefore and end groups of the type:

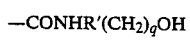

where R'=H or alkyl, q=1-6.

The perfluoropolyethereal diols are obtainable according to known methods, for example as is described in Italian Pat. No. 903446. The ones having z≠0 are obtained by reacting the hydroxymethyl end groups with 1-3 moles of ethylene oxide.

The fluorinated polyurethanes according to the present invention can be of linear structure when the starting hydroxylated or isocyanate components are merely bifunctional and of cross-linked structure when tri- or tetra-functional components are also used. For example it is possible to use tetrahydroxy or tri-hydroxy polyoxyperfluoroalkylenes having an average molecular weight from 500 to 7000 and having a perfluoropolyethereal chain of the type mentioned above and dihydroxylated end groups at one or both ends, of the type:

—CH$_2$O—CH$_2$CH(OH)—CH$_2$OH,
—CO—N(CH$_2$CH$_2$OH)$_2$, the other end group being optionally a mono-hydroxylated group of the type as indicated under (c) hereinbefore.

There are obtainable according to known methods for example the ones cited in Italian Pat. No. 903,446.

In preparing the fluorinated polyurethanes of the present invention the following polyisocyanate compounds can be used:
(a) the diisocyanate having sequences of fluorooxyalkylene units of class I comprised in the general formula:

OCN—R—(Z)$_d$—CF$_2$O(C$_2$F$_4$O)$_m$—(CF$_2$O)$_n$—CF$_2$—(Z)$_d$—R—NCO wherein:
d=0 or 1,
m,n=integer number such as the average molecular weight is comprised in the above mentioned range,
Z=a bivalent linking radical which can be of the type:

—COHN—, —CH$_2$—, —CH$_2$O—, —CH$_2$OCH$_2$—,
—CH$_2$OSO$_2$—,

R is a bivalent aliphatic radical C$_1$-C$_{12}$, or a cycloaliphatic or aromatic bivalent radical, in particular can be:

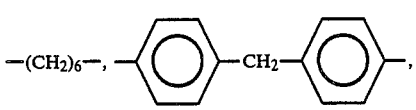
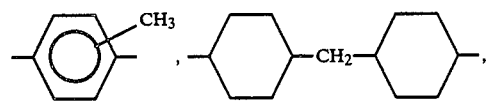
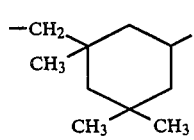

and wherein (CF$_2$O) and (C$_2$F$_4$O) units are randomly distributed along the chain.

The above mentioned fluoropolyoxyalkylene isocyanates can be obtained according to prior art processes, for instance those disclosed by U.S. Pat. No. 3,810,874;
(b) fluorodisocyanates having sequences of fluorooxyalkylene units of class II are in particular chosen from amongst the compounds of the general formula:

OCN—R—(Z)$_d$—(C$_3$F$_6$O)$_r$(C$_2$F$_4$O)$_s$(CFXO)$_t$—(Z)$_d$—R—NCO wherein X=—F or —CF$_3$; d,Z,R have the above defined meaning and indexes r, s and t are integer numbers such as the average molecular weight of the chain is in the above defined range, and (C$_3$F$_6$O), (C$_2$F$_4$O), (CFXO) units are randomly distributed along the chain. These compounds can be obtained through photooxidation of mixtures of C$_3$F$_6$ and C$_2$F$_4$ as described in U.S. Pat. No. 3,665,041 and subsequent conversion of the terminal —COF groups into groups containing the radical —NCO, carried out according to prior art processes described by U.S. Pat. No. 3,847,978 and 3,810,874;
(c) fluorodiisocyanates having sequences of fluorooxyalkylene units of class III are in particular chosen from amongst the compounds of the formula:

OCN—CF$_2$CH$_2$(OCF$_2$CF$_2$CH$_2$)$_p$—OR'$_f$O—(CH$_2$CF$_2$CF$_2$O)$_q$CH$_2$CF$_2$—NCO wherein p, q and R'$_f$ have the above defined meaning; these compounds can be obtained from the corresponding compounds having end groups —COF described by European Pat. No. 148,482, through the conversion of the end groups —COF into —NCO groups as described by U.S. Pat. Nos 3,847,978 and 3,810,874;
(d) fluorodiisocyanates having sequences of fluorooxyalkylene units of class IV are chosen in particular from amongst the compounds of the following general formula:

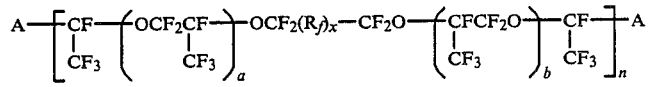

wherein A is a group containing the —NCO function, for instance —CH$_2$NCO; a,b and R$_f$ have the above meaning and n is an integer equal or higher than 1. These compounds are described by European Pat. No. 151,877;
(e) non fluorinated diisocyanates, for instance those comprised in the general formula:

OCN—R—NCO wherein R is the organic bivalent radical described in preceeding item (a).

As starting diols, beside the ones non containing fluorooxyalkylen units and comprising aromatic or cycloaliphatic or polycyclic rings as above defined, the following compounds can be used:
(a) diols having sequences of fluorooxyalkylene units of class I and comprised in general formula (1);
(b) diols having sequences of fluoroxyalkylene units of class II and comprised in general formula:

HO—CH$_2$CF$_2$—(C$_3$F$_6$O)$_r$(C$_2$F$_4$O)$_s$(CFXO)$_t$—CF$_2$—CH$_2$—OH wherein X is F or CF$_3$, indexes r,s,t are integers such as the molecular weight is comprised in the above defined range.

These compounds can be obtained through photooxidation of mixtures C$_3$F$_6$+C$_2$R$_4$ as described in U.S. Pat. No. 3,665,041 and subsequent conversion of end groups —COF into end groups containing —OH according to the methods described by U.S. Pat. Nos. 3,847,978, 3,810,874;

(c) diols having sequences of fluoroxyalkylene units of class III are in particular those obtained from the compounds of general formula:

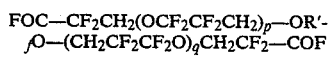
/O—(CH$_2$CF$_2$CF$_2$O)$_q$CH$_2$CF$_2$—COF wherein p, q, R'$_f$ have the above defined meaning, and described in European Pat. No. 148,482, the conversion of —COF groups into —CH$_2$OH groups being carried out according to the methods described by U.S. Pat. Nos. 3,847,978 and 3,810,874;

(d) diols having sequences of fluorooxyalkylene units of class IV are in particular chosen from amongst the compounds of general formula:

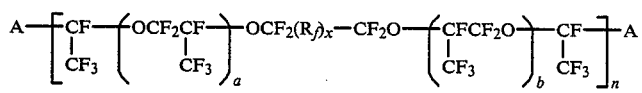

where in A is a group containing —OH, for instance —CH$_2$OH, and a,b,n,x,R$_f$ have the above said meanings.

These compounds are described in European Pat. No. 151,877.

The polyurethanes of the present invention are prepared starting from isocyanate and hydroxylated components in such amounts as to be included in the ranges indicated hereinafter.

For 100 equivalents of isocyanate group are used:
from 1 to 100 equivalents of —OH of type (B) and preferably at least 5;
from 0 to 98 equivalents of —OH of polyoxyfluoroalkylene diols defined in items a,b,c, and d;
from 0 to 98 equivalents of —OH of trihydroxy or tetrahydroxy components.

Furthermore, for 100 equivalents of isocyanate are used from 50 to 100 equivalents of total hydroxyls and preferably from 70 to 100.

The use of polyols of type (B) in the fluorinated polyurethanes synthesis according to the invention permits to obtain polymeric materials with a hardness, which is high enough for most of appliances, and having improved mechanical properties as compared with the perfluoropolyurethanes of the art: reference should be made to the above-cited Italian Pat. No. 903,446 in particular as regards tensile strength, elongation and modulus of elasticity, the hardness being equal.

The introduction of rigid, sterically hindering monomeric units, deriving from component (B), into the perfluoropolyethereal chain did not lead, surprisingly, to an increase in the Tg typical of the perfluoropolyethereal chains.

In fact, the products according to the invention exhibit, analogously with the perfluoropolyurethanes of the art, a very low Tg and by consequence a good flexibility even at extremely low temperatures.

The proper cross-linking degree in the final polymer is obtained through the use of tri- or tetrafunctional polyols, or also by the use of an excess of isocyanate and subsequent formation of isocyanurate cyclic groups.

The polyurethanes of this invention are preparable by a one-step process, by mixing together the various components and allowing them to react, for example in a mold at temperatures from 20° to 100° C., or, more suitably, by a two-step process, mixing at first the diisocyanate component with the diol of type B and optionally also with polyoxyfluoroalkylene diols and reacting them at 20°–100° C. in order to lengthen the macromolecular chain till a certain molecular value is obtained. In this way it is possible to obtain a sufficiently stable prepolymer, which can be successively converted into the final polymeric product by addition of polyfunctional trihydroxy or tetrahydroxy component which acts as a cross-linking agent, by employing the modalities and apparatuses which are most suitable for the type of application required.

The addition of an efficient catalytic system permits to operate at low temperature (20°–60° C.) and in short times. Furthermore, a proper dosing of the catalyst enables to optimize the pot life, i.e. the time during which the reaction mixture remains sufficiently fluid.

As catalysts it is possible to utilize derivatives of tin, such as dibutyltin dilaurate, dibutyltin acetate, dibutyltin oxide, iron derivatives such as ferroacetylacetonate, titanium alcoholates such as titanium tetraisopropylate, tertiary amines such as triethylamine, in amounts ranging from 0.001 to 2% by weight referred to the total weight, preferably from 0.01 to 0.5%.

According to another process, a difunctional hydroxylated prepolymer is reacted with an excess of isocyanate in order to obtain a prepolymer with isocyanate end groups, the latter being then subjected to an isocyanic group trimerization step, in the presence of trimerization catalysts of the tertiary amine type (triethylamine or N-methyl-morpholine) or the alkaline metal alkoxide type, or the like.

The polyurethanes obtained according to the present invention are elastomers free from residual tackiness and, in the case of a sufficient cross-linking, are insoluble in the common organic solvents and in particular fluorinated solvents, such as 1,1,2-trichloro-trifluoroethane or in mixtures thereof.

They exhibit an excellent flexibility at very low temperatures as their glass transition temperature is below −80° C. and in most cases below −100° C. Furthermore, they are resistant to the commonest chemical agents and are stable towards hydrolytic degradation.

For example, the mechanical properties of the materials prepared according to this invention remain unaltered after a 4-day treatment with steam or after a 14-day immersion in water containing 3% of NaCl.

Appliances

The fluorinated polyurethanes of the present invention can be usefully employed for obtaining protective coatings, characterized by low wettability and high resistance to atmospherical agents.

Another important utilization is that as high-density binder for rocket propellants. In such case, the starting products for the preparation of polyurethane or the polymerization intermediate (prepolymer) are mixed with the oxidant (for example perchlorate) and with the solid fuel (for example aluminium powder), and the resulting mixture is poured into the proper container and is caused to cure by polymerization. The polymeric products according to the invention offer the advantage of making possible to reach a sufficient cross-linking degree and, thus, a sufficient degree of hardness and of mechanical properties even by making the curing to occur at a relatively low temperature (not higher than 100° C.).

A further utilization of the polymeric products of the invention is in the field of the adhesives. The extremely low Tg value and the consequent good flexibility at low temperatures is an important characteristic for the utilization in apparatuses subjected to very low temperatures.

The following examples are given to illustrate the present invention and are not to be considered as a limitation of the embodiments thereof.

EXAMPLE A

In a three-neck flask there were mixed, under a nitrogen atmosphere, 80 g (26.7 m.moles) of $\alpha\omega$-bis(tolylisocyanate)-polyoxyperfluoroalkylene having a molecular weight equal to 2000 (formula II, 0.45 g (1.35 m.moles) of 2.2-hexafluoropropylidene-bisphenol and 0.25 g of a 0.25M solution of dibutyltin dilaurate in acetone.

The reaction mixture was stirred at 60° C. during 2 hours. Subsequently, 14.3 g (6.675 m.moles) of a tetrahydroxypolyoxyperfluoroalkylene having a molecular weight=2148 (formula III) were added and, after mixing for a few minutes, the mixture was stripped and poured into a mold, were it was kept at 50° C. during 48 hours.

Obtained was an elastomeric transparent, non-tacky polyurethane, insoluble in 1,1,2-trichlorotrifluoroethane (Freon 113), characterized by a glass transition temperature equal to −124° C. (determined by differential thermal analysis) and by the following mechanical properties:

EXAMPLES B–D

Examples B–D show the influence exerted by the equivalents of tetrafunctional polyoxyperfluoroalkylene on the polymers' final characteristics.

According to the modalities of example A, a series of elastomeric polyurethanes was prepared, maintaining unaltered the ratio: equivalents of isocyanate/equivalents of total OH=1 and varying the tetrahydroxypolyoxyperfluoroalkylene content.

The characteristics of polymers obtained are reported in Table 1.

TABLE 1

| Ex. | Equivalent ratio III/I | Tg (°C.) | Hardness (Shore A/3″) | T.S. (kg/cm$^2$) | E.B. (%) | Modulus 100% (kg/cm$^2$) |
|---|---|---|---|---|---|---|
| A | 0.5 | −124 | 21 | 11 | 560 | 2.7 |
| B | 0.6 | −118 | 29 | 19.5 | 480 | 3.5 |
| C | 0.7 | −124 | 30 | 20.4 | 418 | 5.8 |
| D | 0.85 | −120 | 33 | 21.6 | 358 | 6.0 |

EXAMPLE E 80 g (26.7 m.moles) of $\alpha,\omega$-bis(tolylisocyanate)-polyoxyperfluoroalkylene having a molecular weight=3000 and 0.25 g of a 0.25M solution of dibutyltin acetate in acetone were additioned, in a nitrogen atmosphere, with a solution of 4.5 g (13.35 m.moles) of 2,2-hexafluoro-isopropylidenebisphenol (Bisphenol AF) in a 80/20 by volume mixture of 1,1,2-trichlorotrifluoroethane (Freon 113)/acetone.

It was allowed to react at 60° C. during 2 hours, while slowly removing the solvents, thus obtaining a homogeneous mixture. To the resulting prepolymer there were added 14.3 g (6.675 m.moles) of tetrahydroxypolyoxyperfluoroalkylene having a molecular weight=2148 and, after having rendered the mixture homogeneous, the gases were stripped off from the mixture, which was poured into a mold and left at 50° C. during 48 hours.

Obtained was a transparent, consistent and nontacky elastomeric polyurethane, insoluble in Freon 113, characterized by a glass transition temperature=−123° C.

hardness (Shore A/3″) = 21 (according to ASTM D 2240, determination after 3″)

tensile strength (T.S.) = 11 Kg/cm$^2$  
elongation at break (E.B.) = 560%   } according to ASTM D 412 at 23° C., DIE C  
modulus (100%) = 2.7 Kg/cm$^2$

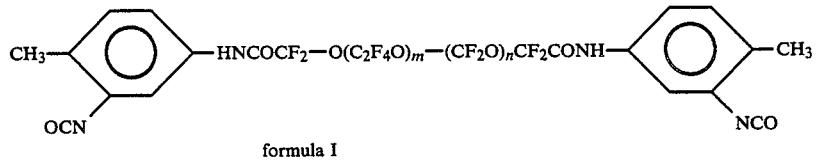

formula I

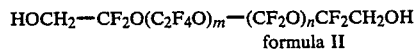

formula II

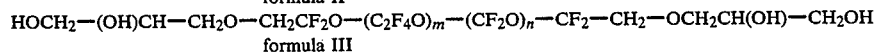

formula III

In the above formulas the m/n ratio is of about 0.7.
The average molecular weights are the ones indicated herein-above.

EXAMPLE F

Example E was repeated, except that the Freon 113/acetone solution contained equimolar amounts of bisphenol AF and $\alpha,\omega$-bis(hydroxymethyl)-polyoxyperfluoroalkylene having a molecular weight=2000, for a total amount of 13.35 m.moles.

Table 2 shows the effect of the starting molar ratio diol 2000/bisphenol AF.

TABLE 2

| Ex. | Molar ratio diol 2000/bisph. AF (%) | Tg (°C.) | Hardness (Shore A/3″) | T.S. (kg/cm²) | E.B. (%) | Eo (kg/cm²)[1] |
|---|---|---|---|---|---|---|
| A | 90/10 | −124 | 21 | 11 | 560 | 6 |
| F | 50/50 | −119 | 30 | 24.1 | 604 | 18 |
| E | 0/100 | −123 | 58 | 44.7 | 452 | 73 |

[1]starting modulus of elasticity.

EXAMPLE G

Example A was repeated by using an α,ω-bis (hydroxymethyl)-polyoxyperfluoroalkylene with a molecular weight=400 instead of 2000.

This monomer imparts a higher rigidity to the polymeric structure. Obtained was an elastomeric polyurethane, insoluble in Freon 113, characterized by an excellent flexibility to very low temperatures and by the following mechanical properties:

| | |
|---|---|
| hardness (Shore A/3″) = | 24 |
| T.S. (tensile strength) = | 15.6 Kg/cm² |
| E.B. (elongation at break) = | 533% |
| modulus (100%) = | 3.4 Kg/cm² |

EXAMPLE H

A solution of 9 g (26.7 m.moles) of bisphenol AF in a 80/20 by volume mixture of Freon 113/acetone was added, in a nitrogen atmosphere, to 80 g (26.7 m.moles) of α,ω-bis(tolylisocyanate)polyoxyperfluoroalkylene having a molecular weight=3000, and 0.25 g of a 0.25M solution of dibutyltin acetate in acetone.

It was allowed to react at 50° C. during 3 hours, while gradually removing the solvents. A homogeneous and viscous mixture was obtained which, after stripping, was poured into a mold and left at 50° C. during 24 hours and at 100° C. during 6 hours.

A thermoelastomeric, transparent polyurethane was obtained, which was soluble in Freon 113, exhibited a Tg=−120° C. and was characterized by the following mechanical properties:

| | |
|---|---|
| hardness (Shore A/3″) = | 73 |
| yield strength = | 21.8 Kg/cm² |
| E.B. (elongation at break) = | 128% |

EXAMPLE I (COMPARATIVE TEST)

In a nitrogen atmosphere there were mixed 33.3 g (10.9 m.moles) of α,ω-bis(isoforondiisocyanate)-polyoxyperfluoroalkylene of formula:

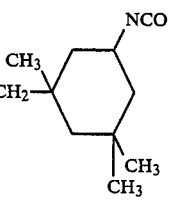

$$OCN\text{-cyclohexyl(CH_3)_3}\text{-}CH_2\text{-}NHCOCF_2\text{-}(CF_2F_4O)_nCF_2CONH\text{-}CH_2\text{-cyclohexyl(CH_3)_3}\text{-}NCO$$

having a molecular weight=3048, 10.9 g (5.45 m.moles) of -bis-(hydroxymethyl)-polyoxyperfluoroalkylene having a molecular weight=2000 and 0.8 g of a 0.20M solution of dibutyltin dilaurate in acetone.

The whole was reacted at 50° C. during 3 hours; during this time, a progressive increase in the viscosity was observed. At last, 5.9 g (2.75 m.moles) of tetrahydroxy-derivative (molecular weight=2148) were added and, after mixing and stripping off of the gases, the whole was poured into a mold. After 48 hours at 50° C. and 24 hours at 100° C. the mass remained tacky and non-consistent.

EXAMPLE L

Example I was repeated, adding to the component mixture, as a substitution for the only dihydroxy-derivative, a mixture of 9.8 g (4.9 m.moles) of the same dihydroxy-derivative and 0.19 g (0.55 m.moles) of bisphenol AF.

In such case the resulting polyurethane was consistent and non-tacky, exhibited a Tg=−122° C. and the following mechanical properties:

| | |
|---|---|
| hardness (Shore A/3″) = | 12 |
| T.S. (tensile strength) = | 8 Kg/cm² |
| E.B. (elongation at break) = | 716%. |

From this example, by comparison with the preceding one, it is apparent the efficaciousness of the addition of di- or poly-hydroxy-derivatives containing hindering groups, which, even if they are additioned in small amounts, are sufficient to impart rigidity and consistency to the polymeric structure.

EXAMPLE M

According to the modalities described in example F, elastomeric fluorinated polyurethanes were prepared by synthesis, using, instead of bisphenol AF, 1,4-cyclohexane dimethanol (cis+trans).

The resulting polymer, which was insoluble in Freon 113, in organic solvents or in mixtures, was characterized by flexibility to low temperatures (Tg=−119° C.) and by an excellent resistance to hydrolysis. The mechanical properties were as follows:

| | |
|---|---|
| hardness (Shore A/3″) = | 27 |
| T.S. (tensile strength) = | 22 Kg/cm² |
| E.B. (elongation at break) = | 600% | starting modulus = 16 Kg/cm²

EXAMPLE N

Into a 3-neck flask containing 50 g (25 m.moles) of α,ω-bis(tolylisocyanate)-polyoxyperfluoroalkylene having an average molecular weight=2000, and 2.25 g of a solution at 2.5% by weight of N-methylmorpholine in acetone, there was introduced, in a nitrogen atmosphere, a solution of 6.5 g (19.2 m.moles) of bisphenol AF in a 80/20 mixture of Freon/acetone.

The ratio between isocyanate equivalents and hydroxyl resulted to be equal to 1.3.

After having stirred the mixture during 1 hour at 40° C., it was poured into a mold and the cross-linking reaction was started, leaving the mixture during 24 hours at 70° C. and during further 24 hours at 130° C.

The resulting polyurethane was a non-tacky elastomeric material, insoluble in Freon, and exhibiting the following characteristics:

| | |
|---|---|
| Tg = | −122° C. |
| hardness (Shore A/3") = | 42 |
| T.S. (tensile strength) = | 28.7 Kg/cm² |
| E.B. (elongation at break) = | 580% |
| modulus (100%) = | 5.6 Kg/cm² |

What is claimed is:

1. Method for producing protective coatings characterized by a low wettability and by a high resistance to atmospheric agents, wherein a coating layer consisting essentially of a fluorinated polyurethane having a glass transition temperature lower than −80° C., characterized by a chain structure comprising:
(A) sequences having average molecular weights of 500–7000 and consisting of fluorooxyalkylene units selected from the following classes:
I—($C_2F_4O$), ($CF_2O$), said units being randomly placed along the fluoropolyoxyalkylene chain;
II—($C_3F_6O$), ($C_2F_4O$), (CFXO) wherein X=F or $CF_3$, said units being randomly placed along the fluoropolyoxyalkylene chain;
III—($CH_2CF_2CF_2O$), said units in the fluoropolyoxyalkylene chain being linked between them as follows:

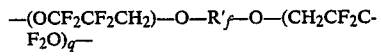

wherein R'$_f$ is a fluoroalkylene group and p and q are integers, p+q being greater than 2;
IV

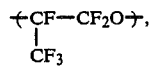

said units being linked between them in the fluoropolyoxyalkylene chain as follows:

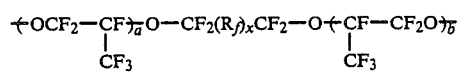

wherein R$_f$ is a fluoroalkylene group, x is 0 or 1, a and b are integers, a+b being greater than 2; and (B) units derived from fluorinated or non-fluorinated diols or triols containing one or more aromatic or cycloaliphatic or polycyclic rings, said diols and triols being selected from:

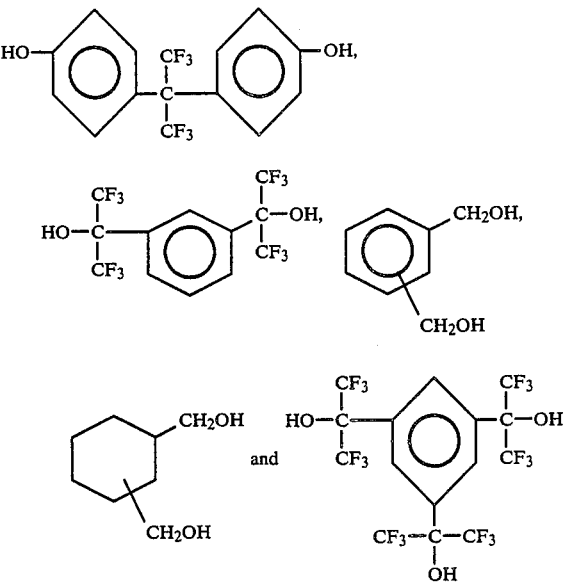

and characterized further in that for each type B unit there are present 1 to 20 fluoropolyoxyalkylene sequences as defined in item (A), is formed by a process consisting essentially in the reaction of:
(a) one or more di-isocyanates containing sequences of fluorooxyalkylene units of class from I to IV and having average molecular weights of 500–7000, with;
(b) polyols as defined in item B and optionally with;
(c) one or more fluoropolyoxyalkylene diols having sequences of fluorooxyalkylene units of class I to IV, having average molecular weights of B 500–700, and optionally with:
(d) trihydroxy- or tetrahydroxy-polyoxyperfluoroalkylenes having average molecular weights of 500–7000, and furthermore characterized in that for an amount of component (a) equal to 100 equivalents of isocyanate there are used an amount of component (b) equal to 5–100 equivalents of —OH, the total amount of equivalents —OH being equal to B 70–100.

2. Method for preparing propellant mixtures for rockets wherein as binders fluorinated polyurethanes having a glass transition temperature lower than −80° C., characterized by a chain structure comprising:
(A) sequences having average molecular weights of 500–7000 and consisting of fluorooxyalkylene units selected from the following classes:
I—($C_2F_4O$), ($CF_2O$), said units being randomly placed along the fluoropolyoxyalkylene chain;
II—($C_3F_6O$), ($C_2F_4O$), (CFXO) wherein X=F or $CF_3$, said units being randomly placed along the fluoropolyoxyalkylene chain;
III—($CH_2CF_2CF_2O$), said units in the fluoropolyoxyalkylene chain being linked between them as follows:

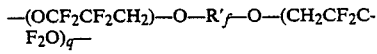

wherein $R'_f$ is a fluoroalkylene group and p and q are integers, p+q being greater than 2;

IV

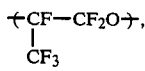

said units being linked between them in the fluoropolyoxyalkylene chain as follows:

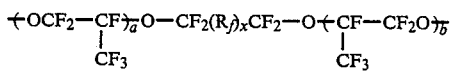

wherein $R_f$ is a fluoroalkylene group, x is 0 or 1, a and b are integers, a+b being greater than 2; and (B) units derived from fluorinated or non-fluorinated diols or triols containing one or more aromatic or cycloaliphatic or polycyclic rings, said diols and triols being selected from:

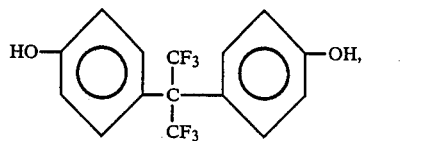

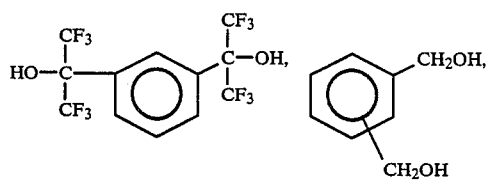

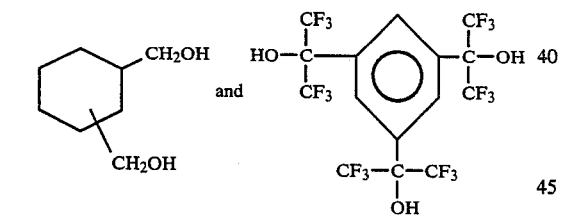

and characterized further in that for each type B unit there are present 1 to 20 fluoropolyoxyalkylene sequences as defined in item (A).

3. Method for preparing adhesives which retain good elasticity and flexibility even at very low temperatures, wherein as adhesive material the fluorinated polyurethanes are used having a glass transition temperature lower than −80° C., characterized by a chain structure comprising:

(A) sequences having average molecular weights of 500–7000 and consisting of fluorooxyalkylene units selected from the following classes:

I—$(C_2F_4O)$, $(CF_2O)$, said units being randomly placed along the fluoropolyoxyalkylene chain;

II—$(C_3F_6O)$, $(C_2F_4O)$, $(CFXO)$ wherein X=F or $CF_3$, said units being randomly placed along the fluoropolyoxyalkylene chain;

III—$(CH_2CF_2CF_2O)$, said units in the fluoropolyoxyalkylene chain being linked between them as follows:

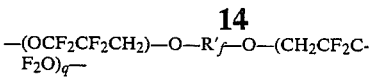

wherein $R'_f$ is a fluoroalkylene group and p and q are integers, p+q being greater than 2;

IV

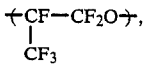

said units being linked between them in the fluoropolyoxyalkylene chain as follows:

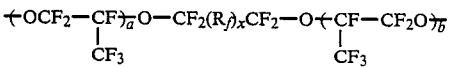

wherein $R_f$ is a fluoroalkylene group, x is 0 or 1, a and b are integers, a+b being greater than 2; and (B) units derived from fluorinated or non-fluorinated diols or triols containing one or more aromatic or cycloaliphatic or polycyclic rings, said diols and triols being selected from:

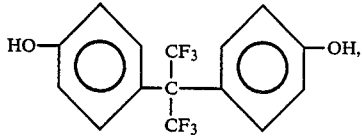

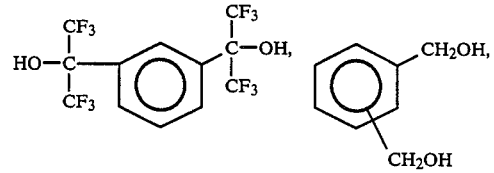

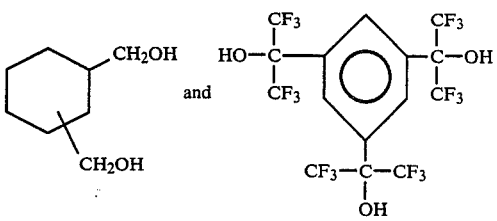

and characterized further in that for each type B unit there are present 1 to 20 fluoropolyoxyalkylene sequences as defined in item (A).

4. A fluorinated polyurethane having a glass transition temperature lower than −80° C., characterized by a chain structure comprising:

(A) sequences having average molecular weights of 500–7000 and consisting of fluorooxyalkylene units selected from the following classes:

I—$(C_2F_4O)$, $(CF_2O)$, said units being randomly placed along the fluoropolyoxyalkylene chain;

II—$(C_3F_6O)$, $(C_2F_4O)$, $(CFXO)$ wherein X=F or $CF_3$, said units being randomly placed along the fluoropolyoxyalkylene chain;

III—$(CH_2CF_2CF_2O)$, said units in the fluoropolyoxyalkylene chain being linked between them as follows:

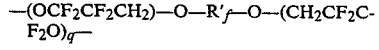

wherein R'$_f$ is a fluoroalkylene group and p and q are integers, p+q being greater than 2;

IV

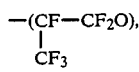

said units being linked between them in the fluoropolyoxyalkylene chain as follows:

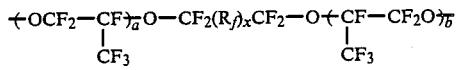

wherein R$_f$ is a fluoroalkylene group, x is 0 or 1, a and b are integers, a+b being greater than 2; and
(B) units derived from fluorinated or non-fluorinated diols or triols containing one or more aromatic or cycloaliphatic or polycyclic rings, said diols and triols being selected from:

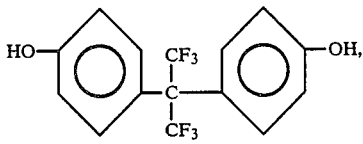

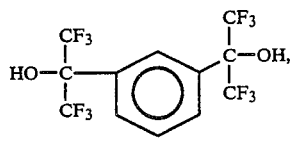 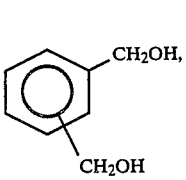

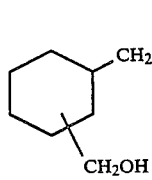 and 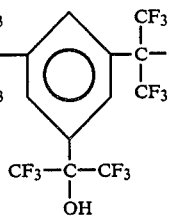

and characterized further in that for each type B unit there are present 1 to 20 fluoropolyoxyalkylene sequences as defined in item (A).

5. Process for obtaining fluorinated polyurethane having a glass transition temperature lower than −80° C., characterized by a chain structure comprising:
(A) sequences having average molecular weights of 500–7000 and consisting of fluorooxyalkylene units selected from the following classes:
I—(C$_2$F$_4$O), (CF$_2$O), said units being randomly placed along the fluoropolyoxyalkylene chain;
II—(C$_3$F$_6$O), (C$_2$F$_4$O), (CFXO) wherein X=F or CF$_3$, said units being randomly placed along the fluoropolyoxyalkylene chain;
III—(CH$_2$CF$_2$CF$_2$O), said units in the fluoropolyoxyalkylene chain being linked between them as follows:

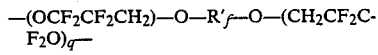

wherein R'$_f$ is a fluoroalkylene group and p and q are integers, p+q being greater than 2;

IV

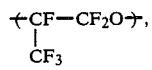

said units being linked between them in the fluoropolyoxyalkylene chain as follows:

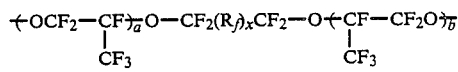

wherein R$_f$ is a fluoroalkylene group, x is 0 or 1, a and b are integers, a+b being greater than 2;
(B) units derived from fluorinated or non-fluorinated diols or triols containing one or more aromatic or cycloaliphatic or polycyclic rings, said diols and triols being selected from:

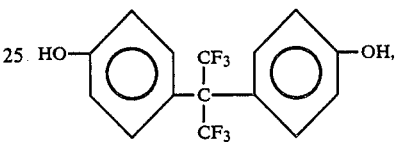

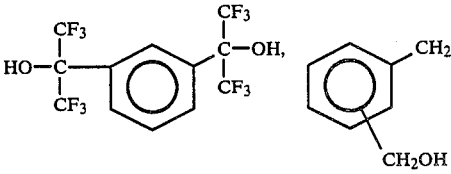

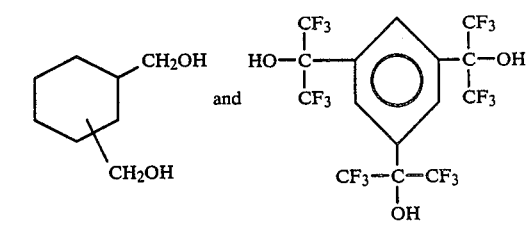

and characterized further in that for each type B unit there are present 1 to 20 fluoropolyoxyalkylene sequences as defined in item (A), said process consisting essentially in the reaction of:
(a) one or more di-isocyanates containing sequences of fluorooxyalkylene units of class from I to IV and having average molecular weights of 500–7000, with;
(b) polyols as defined in item B and optionally with;
(c) one or more fluoropolyoxyalkylene diols having sequences of fluorooxyalkylene units of class I to IV, having average molecular weights of 500–7000, and optionally with:
(d) trihydroxy- or tetrahydroxy-polyoxyperfluoroalkylenes having average molecular weights of 500–7000, and furthermore characterized in that for an amount of component (a) equal to 100 equivalents of isocyanate there are used an amount of component (b) equal to 5–100 equivalents of —OH, the total amount of equivalents —OH being equal to 70–100.

* * * * *